United States Patent [19]

Crosby

[11] Patent Number: 4,890,296
[45] Date of Patent: Dec. 26, 1989

[54] HOUSING FOR THE OUTPUT COUPLER OF A LASER

[75] Inventor: Robert A. Crosby, Naperville, Ill.

[73] Assignee: Amoco Corporation, Chicago, Ill.

[21] Appl. No.: 300,087

[22] Filed: Jan. 19, 1989

[51] Int. Cl.$^4$ ................................................ H01S 3/08
[52] U.S. Cl. .................................... 372/107; 372/103; 372/108
[58] Field of Search ................. 372/108, 98, 101, 103, 372/107

[56] References Cited

U.S. PATENT DOCUMENTS

| | | | |
|---|---|---|---|
| 3,478,608 | 11/1969 | Met ....................................... | 372/107 |
| 3,764,934 | 10/1973 | Schamberger ....................... | 372/107 |
| 4,575,853 | 3/1986 | Jako ....................................... | 372/98 |
| 4,653,063 | 3/1987 | Acharekar et al. .................. | 372/107 |
| 4,777,639 | 10/1988 | Whitehouse ......................... | 372/109 |

Primary Examiner—Léon Scott, Jr.
Attorney, Agent, or Firm—Gary C. Cunningham; William H. Magidson; Ralph C. Medhurst

[57] ABSTRACT

This invention relates to a housing for the output coupler of a laser which comprises an elongated body having a longitudinally extending bore and a cap having an aperture. The body and cap are configured to snap-fit together to maintain a stable orientation of the output coupler in axial relationship with the bore of the elongated body.

15 Claims, 2 Drawing Sheets

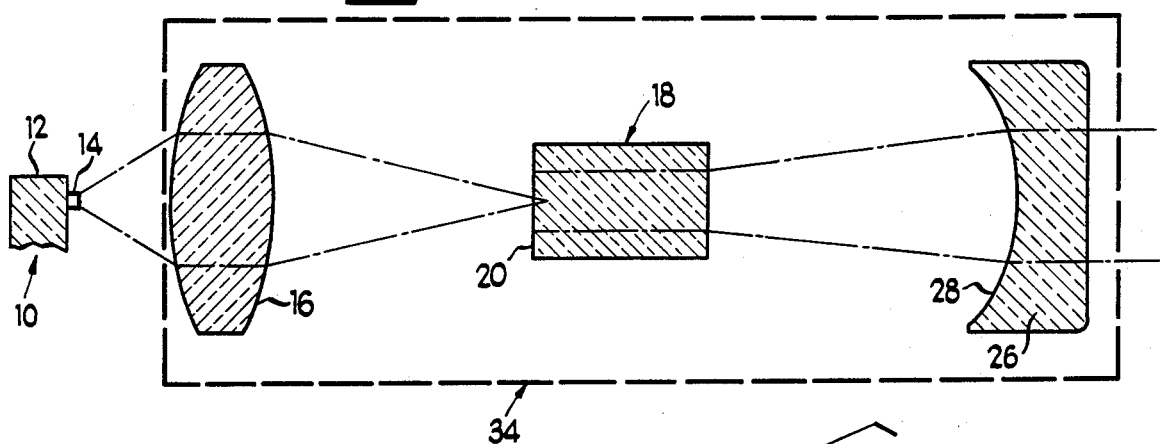
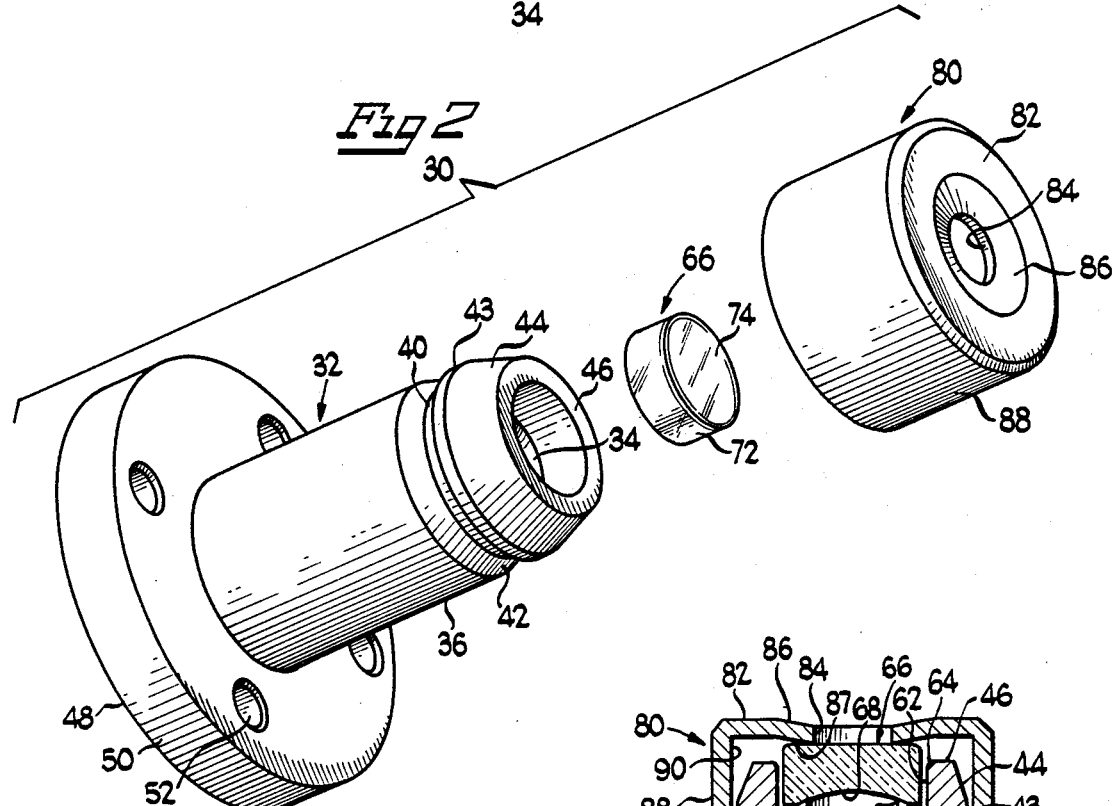
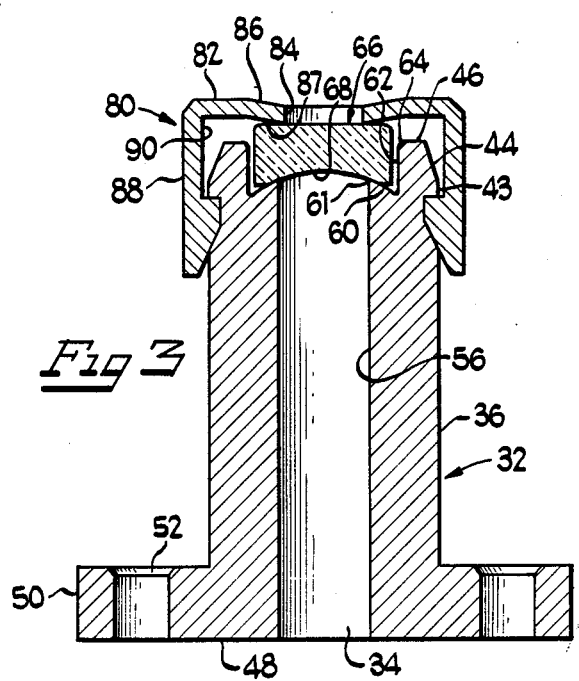

HOUSING FOR THE OUTPUT COUPLER OF A LASER

FIELD OF THE INVENTION

This invention relates to a housing for the output coupler of a laser, which comprises an elongated body having a longitudinally extending bore and a cap having an aperture. The body and cap are configured to snap-fit together to maintain a stable orientation of the output coupler in axial relationship with the bore of the elongated body.

BACKGROUND OF THE INVENTION

A laser is a device which has the ability to produce monochromatic, coherent light through the stimulated emission of photons from atoms, molecules or ions of an active medium which have typically been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of substantially identical energy from other excited atoms, molecules or ions. As a consequence, the initial photon creates a cascade of photons between the reflecting surfaces of the optical cavity which are of substantially identical energy and exactly in phase. A portion of this cascade of photons is then discharged out of the optical cavity, for example, by transmission through an output coupler. These discharged photons constitute the laser output.

Excitation of the active medium of a laser can be accomplished by a variety of methods. However, the most common methods are optical pumping, use of an electrical discharge, and passage of an electric current through the p-n junction of a semiconductor laser. Semiconductor lasers contain a p-n junction which forms a diode, and this junction functions as the active medium of the laser. Such devices are also referred to as laser diodes. The efficiency of such lasers in converting electrical power to output radiation is relatively high, and for example, can be in excess of 40 percent.

Small angular misalignments of optical components of a laser can result in substantial losses in laser output power. Accordingly, laser resonators are designed to ensure the maintenance of a stable orientation of these optical components. Ambient temperature fluctuations and temperature fluctuations produced as an undesired by-product of laser operation have also placed constraints on the design of laser resonators. These temperature fluctuations can result in thermally induced distortions of the resonator and associated misalignment of the optical components within the resonator. Accordingly, conventional laser designs have addressed this problem through the use of materials having a low coefficient of thermal expansion, such as Invar, quartz and various ceramics, and also by using external cooling means to thermally stabilize the resonator.

U.S. Pat. Nos. 4,730,335 and 4,731,795 both issued to Clark et al. on Mar. 8, 1988 and Mar. 15, 1988, respectively, are directed to optically pumped solid state lasers which are constructed of components held in association by support structures which are configured to receive the components and automatically arrange them with respect to one another along an optical path.

U.S. Pat. No. 4,526,444, issued to Fantone et al. on July 2, 1985, is directed to a viewfinder assembly for cameras which is fabricated with injection molded plastics. Various optical components of the viewfinder are structured to snap-fit together inside a housing.

In the past, conventional output couplers for lasers have been cemented to end caps. When used in the construction of a laser, such end caps require a precise and time consuming adjustment with set screws, for optimal alignment of the output coupler.

A new but unsuccessful generation of assemblies for output couplers has recently been developed and used in commercial products. The assembly includes a cap with screw threads on the inner wall and a resonator body having screw threads on the outer wall. The cap and resonator body are screwed together, with an output coupler sandwiched therebetween. This assembly was found to be unsatisfactory due to the cap changing properties and loosening as a result of the multiplicity of thermal cycles such assembly was subjected to. Once the cap was loosened, the angular misalignment of the output coupler resulted in a substantial loss in laser output power or total failure.

SUMMARY OF THE INVENTION

The instant invention discloses a housing for the output coupler of a laser, comprising:

a. an elongated body having a longitudinally extending bore, said body including an outer surface including anchoring means for securely connecting a cap thereto and said bore including an inner surface including means for aligning said output coupler with said bore of said body; and b. said cap including an end having an aperture and a sidewall including snap-fitting interconnecting means for interconnecting said cap to said anchoring means of said body, said output coupler being securely held between said alignment means of said inner surface of said body and said end of said cap, wherein said output coupler is in axial alignment with said bore of said body.

An object of the invention is to provide a housing for the output coupler of a laser that is portable, compact, lightweight, durable, insensitive to shock, simple in construction, inexpensive, and easy to assemble.

Another object of the invention is to provide a housing for the output coupler of a laser that will maintain the alignment of the output coupler despite being subjected to a multiplicity of severe temperature fluctuations normally associated with lasers.

A further object of the invention is to provide a housing for the output coupler of a laser which can be constructed, at least in part, from materials which have a relatively low coefficient of thermal expansion and a relatively high modulus of elasticity.

A further object of the invention is to provide a housing for the output coupler of a laser which is particularly adapted to being mass produced.

A still further object of the invention is to provide a housing for the output coupler of a laser which can be constructed, at least in part, by the use of injection molding techniques.

BRIEF DESCRIPTION OF THE DRAWINGS

FIG. 1 of the drawings is a schematic view representative of a laser diode-pumped solid state laser.

FIG. 2 of the drawings is an exploded perspective view of one embodiment of this invention.

FIG. 3 of the drawings is a cross-sectional view of the embodiment set forth in FIG. 2.

DETAILED DESCRIPTION OF THE PREFERRED EMBODIMENTS

Figure 4:
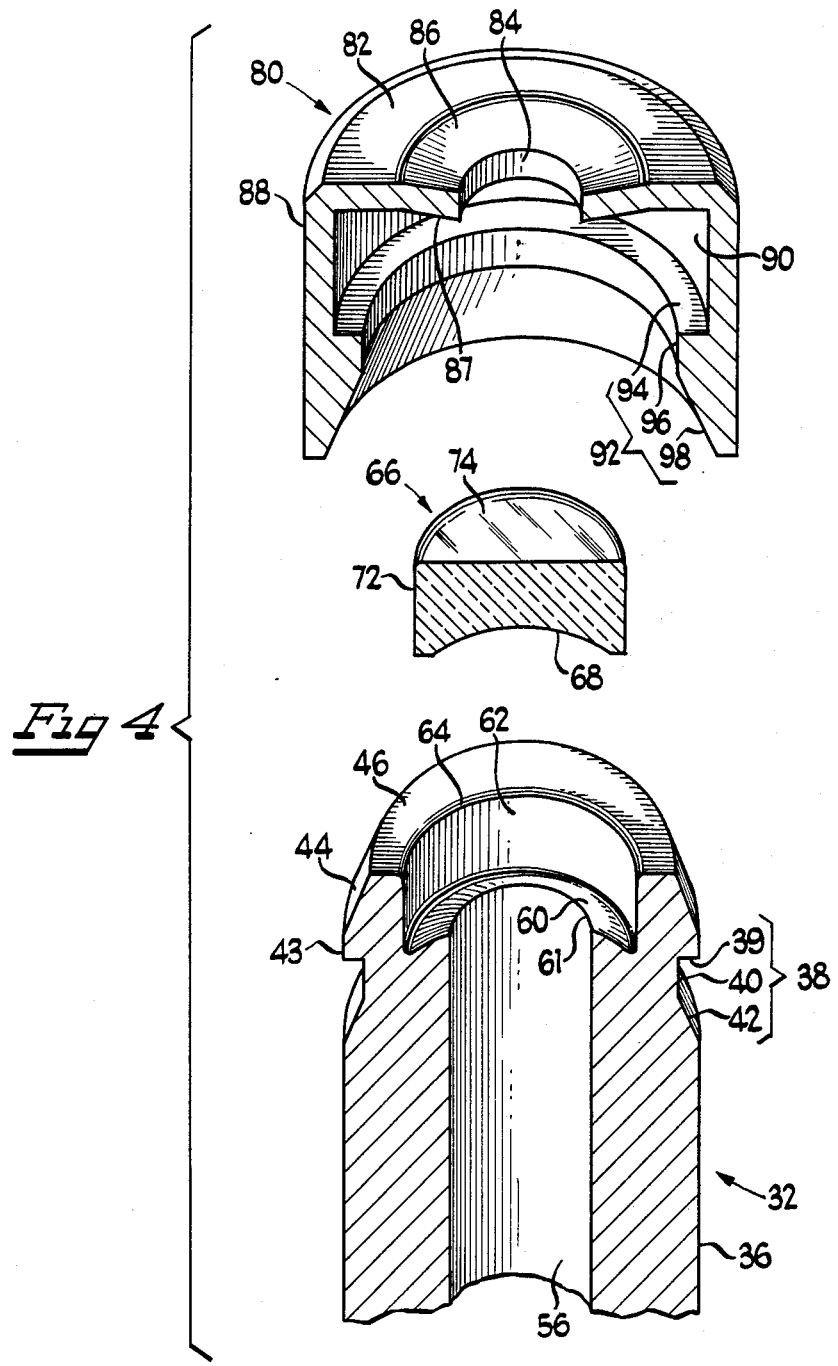
FIG. 4 of the drawings is an exploded three-dimensional view of the embodiment set forth in FIG. 2.

While this invention is susceptible of embodiments in many forms, there are shown in FIGS. 2–4 an embodiment suitable for use in the practice of this invention, with the understanding that the present disclosure is not intended to limit the invention to the embodiment illustrated.

Referring to FIG. 1, a laser diode-pumped solid state laser is illustrated, which includes an optical pumping means 10 consisting of a heat sink 12 and a laser diode 14 attached thereto. Light from laser diode 14 is guided by lens 16 into lasant material 18. Output radiation from the laser is discharged through output coupler 26.

A highly suitable laser diode 14 is a gallium aluminum arsenide laser diode. The output radiation from laser diode 14 should substantially match an appropriate absorption band of lasant material 18.

Heat sink 12 can be passive in character and can also include a thermoelectric cooler to help maintain laser diode 14 at a constant temperature for helping to ensure optimal operation thereof. During operation the laser diode 14 will be attached to a suitable power supply, which is not illustrated in FIG. 1.

Lasant material 18 has a suitable reflective coating on input surface 20 and is capable of being pumped by the light from laser diode 14. The reflective coating on input surface 20 is highly transparent with respect to light produced by the laser diode 14 but is highly reflective with respect to light produced by the lasing of lasant material 18.

The optical cavity of the laser is formed by the reflective coating on surface 20 of the lasant material and a reflective coating on surface 28 of output coupler 26. The coating on surface 28 is selected such that it is sufficiently reflective for light generated by the lasing of lasant material 18 to permit the generation of a resonant field within the optical cavity while transmitting a portion of this light as output radiation from the laser. If desired, the output coupler 26 can be constructed in such a manner that it collimates the laser's output radiation. Output coupler 26 need not be of the precise design illustrated in FIG. 1 and can be of any conventional form.

Pumping radiation from laser diode 14 should substantially match an appropriate absorption band of lasant material 18. This matching can be difficult to achieve, because the laser diode 14 is sensitive to temperature, current variations and aging. If desired, the laser diode 14 can be connected to sensitive feedback and thermoelectric heater/cooler circuitry to aid and enhance the matching of the absorption peak of the lasant material 18 to the output radiation of laser diode 14.

Lens 16 serves to focus light from laser diode 14 into lasant material 18. This focusing results in a high pumping intensity and an associated high photon to photon conversion efficiency in lasant material 18. Any conventional optical means for focusing light can be used in place of lens 16. For example, a gradient index lens, a ball lens, an aspheric lens or a combination of lenses can be utilized.

Any conventional lasant material 18 can be utilized provided that it is capable of being optically pumped by the laser diode selected. Suitable lasant materials include, for example, neodymium-doped yttrium vanadate (Nd:YVO$_4$); neodymium and/or chromium-doped gadolinium scandium gallium garnet (Nd, Cr:GSGG); thalium, holmium and/or erbium-doped yttrium aluminum garnet (Tm, Ho, Er:YAG); titanium sapphire (Ti:Al$_2$O$_3$); and glassy and crystalline host materials which are doped with an active material. Highly suitable active materials include, ions of chromium, titanium and the rare earth metals. Neodymium-doped YAG is a highly suitable lasant material 18 for use in combination with a laser diode 14 which produces light having a wavelength of about 808 nm. When pumped with light of this wavelength, the neodymium-doped YAG or lasant material 18 can emit light having a wavelength of 1,064 nm.

For a neodymium-doped YAG rod 18 which is pumped with light having a wavelength of 808 nm, the coating on input surface 20 should be substantially transparent to 808 nm light and highly reflective with respect to light having a wavelength of 1,064 nm. The wavelength selective mirror which is created by the coating on input surface 20 need not be located on the input surface 20 of lasant material 18. If desired, this mirror can be located anywhere between laser diode 14 and the lasant material 18 and can consist of a coating deposited on any suitable substrate. In addition, the mirror can be of any suitable shape.

All of the optical elements illustrated within the dashed line of FIG. 1, can be held within a bore 34 of an elongated body 32, as hereafter discussed.

Referring to FIG. 2, there is schematically shown a housing 30 for an output coupler 66, which includes an elongated body 32 and a cap 80. As FIG. 3 illustrates, when the housing 30 is assembled, the output coupler 66 is normally held securely within, axially aligned, and sandwiched between the elongated body 32 and the cap 80.

Referring to FIG. 2, the elongated body 32 is tubular in shape and has a centrally located bore 34 which extends longitudinally therethrough. The elongated body 32 includes an outer surface 36 which has an anchoring means 38 near the cap end 46, as illustrated in FIG. 4. At the opposite end is a flange end 48, which includes an annular flange member 50 having a plurality of flange bores 52. The flange bores 52 provide a means of securely affixing, attaching and/or aligning the housing 30 to and with an optical pumping means, such as that illustrated as component 10 in FIG. 1. When the optical pumping means is connected to the body 32 by means of flange member 50, the bore 34 can include the other components of an optically pumped solid state laser, for example, lens 16 and lasant material 18, as illustrated in FIG. 1, and output coupler 66 each held in association with the other, and arranged with respect to one another along the optical path defined by bore 34.

As illustrated in FIG. 4, the anchoring means 38 provides a means for securely holding or attaching cap 80 to the elongated body 32 and holding the output coupler 66 against an annular seat or apex 61. The anchoring means 38 in FIG. 4, includes a female member which comprises: (i) a downwardly facing section 39; (ii) an outwardly facing section 40; and (iii) an inclined section 42, which faces upwardly and outwardly.

As illustrated in FIG. 4, the outer surface 36 between anchoring means 38 and end 46, includes a flat portion 43 and a sloped portion 44. In a preferred embodiment as illustrated in FIG. 4, the sloped portion 44 slopes upwardly and inwardly in the direction of end 46 which eases and facilitates the telescopic insertion and snap connection of the cap 80 to the elongated body 32. This design is particularly useful for mass production purposes.

The bore 34 of the elongated body 32 includes an inner surface 56. As illustrated in FIG. 4, the inner surface 56 includes a means for aligning the output coupler, which includes an annular upwardly facing section or ledge 60, an annular apex 61 and an annular inwardly facing section 62. In a preferred embodiment annular ledge 60 faces upwardly and outwardly at an angle ranging from about 30° to about 0° with the horizontal, more preferably about 5° to about 25°, and most preferably about 15°. Such an angle provides a fine annular line of contact to hold the output coupler 66 securely. The output coupler 66 will sit on the fine line of contact defined by the apex 61. The apex 61 provides a stable mounting feature which can be reliably reproduced. In the event that the housing 30 is jarred, the axially aligned, annular and upwardly pointing apex 61 and the restoring force which is provided by the elasticity of the cap 80, insures that the output coupler 66 will remain properly aligned, as illustrated by FIG. 3.

As FIG. 4 illustrates, between the inner surface 62 and cap end 46 of body 32, is a sloped surface 64. The sloped surface 64 is particularly useful for allowing the output coupler 66 to be steered, inserted or dropped into the aligning means in an assembly line or by hand, since the downwardly and inwardly sloped surface 64 directs the output coupler 66 into the aligning means.

Referring to FIG. 4, the output coupler 66 (or 26 in FIG. 1) is conventional in nature and can be of any geometric shape. A preferred output coupler 66 includes a concave surface 68, an annular sidewall surface 72, and an output surface 74 opposite the concave surface 68. The diameter of the inwardly facing section 62 of the aligning means is slightly larger than the diameter of the output coupler 66 as in FIG. 3, thus providing a loose fit when output coupler 66 is placed on top of the aligning means. Unfortunately, conventional output couplers are generally not reliably reproduced in that they are generally not uniform and fail to have uniform tolerances, thicknesses, diameters, wedges, geometric shapes, etc. Conventional output couplers with more precise tolerances are substantially more expensive than ones without. The housing 30 of the instant invention is configured for use with conventional output couplers.

Referring to FIGS. 3 and 4, the cap 80 is tubular in shape and is configured to snap-fit onto the elongated body 32, simply by exerting force telescopically in a generally downward direction in axial alignment with bore 34. The cap 80 includes an end 82 having a centrally located aperture 84, which is in axial alignment with the bore 34. An annular indentation 86 surrounds aperture 84, and is inclined in a downwardly and inwardly direction toward the aperture 84. As illustrated in FIG. 3, the angle of inclination of the indentation 86 from the (horizontal) end 82 to the aperture 84, is in the range from about 1° to about 89°, preferably in the range of from about 5° to about 25°, and most preferably about 15°. The indentation 86 includes an inner annular portion 87 which contacts an annular portion of the output surface 74 of the output coupler 66 in FIG. 3.

The indentation 86 is designed to apply an annular and uniform downward or axial force in a direction through bore 34 toward flange end 48.

The combination of the apex 61 and the inner portion 87 of indentation 86, securely sandwich and prevent the misalignment of the output coupler 66, which can result in a substantial loss in laser output power or total failure. Further, in the event that the housing 30 is somehow traumatized, such as being jarred, shocked, dropped, excessively heated or cooled, etc., the annular axial aligned upwardly facing restoring forces of apex 61, and the annular axial aligned downwardly facing restoring forces of the inner portion 87 of indentation 86, will minimize or prevent the misalignment of the output coupler 66.

Referring to FIG. 4, the cap 80 also includes a sidewall 88, having an inner portion 90 with snap fitting interconnecting means or snap-connecting means 92 for interconnecting or snap-fitting the cap 80 to the anchoring means 38 of the elongated body 32. The snap fitting interconnecting means 92 includes an upwardly facing section 94, an inwardly facing section 96, and an inclined section 98 facing downwardly and inwardly.

The snap fitting interconnecting means 92 defines a male member which snap-fits or interconnects with and to a female member or the anchoring means 38 of the elongated body 32. The female member or anchoring means 38 receives the male member or interconnecting means 92, for securely locking each component together. More particularly, in FIG. 4 the snap fitting interconnecting means 92 comprising upwardly facing, inwardly facing and inclined sections 94, 96 and 98, is inserted, interconnected or snap-fit into the anchoring means 38, comprising downwardly facing, outwardly facing and inclined sections 39, 40 and 42, respectively, to provide a reliable attachment of each component. Although not shown in the figures, in a preferred embodiment, the cap 80 includes three interconnecting means 92 attached to the inner portion of sidewall 90, each interconnecting means being equally spaced at an angle of about 120° apart and each being about 60° wide. Such a design provides a more ductile and elastic cap sidewall 88, which eases and simplifies the telescopic snap connection, while providing a secure grip to the anchoring means 38 of the elongated body 32.

The cap 80 and the elongated body 32 can be made with metals, alloys, ceramics, glass, thermoplastic materials and thermosetting materials, and equivalents and combinations thereof. In a preferred embodiment, the elongated body 32 comprises a thermally conductive material having a low coefficient of thermal expansion, such as Invar. Invar is a low expansion alloy of iron and nickel which comprises about 36 wt. % nickel. In a preferred embodiment, the cap 80 is made of a thermoplastic or thermosetting material which can be readily injection molded, and telescopically connected to the elongated body 32.

In use, the elongated body 32 can be subjected to a multiplicity of thermal cycles, for example, from about ambient temperature to about 60° C. In a preferred embodiment, conventional heating and temperature monitoring devices are placed in close proximity to and around body 32 to maintain a constant temperature along and within the elongated body 32. The maintenance of a constant and stable temperature along body 32 is important for maintaining stable dimensions, tolerances and length of the elongated body 32, while also maintaining a constant index of refraction of the lasant material 18 held in bore 34.

The instant invention solves the problem of angular misalignments of the output coupler 66 of a laser, which results in a substantial loss in laser output power, by providing an excellent and stable housing 30 for the output coupler 66. The housing 30 is configured to ensure the maintenance of a stable orientation of the output coupler 66.

Although only one embodiment of this invention has been shown and described, it is to be understood that various modifications of or substitutions and rearrangements in the preceding embodiment can be made by those skilled in the art without departing from the novel spirit and scope of this invention.

We claim:

1. A housing for the output coupler of a laser, comprising:
   a. an elongated body having a longitudinally extending bore, said body including an outer surface including anchoring means for securely connecting a cap thereto and said bore including an inner surface including means for aligning said output coupler with said bore of said body; and
   b. said cap including an end having an aperture and a sidewall including snap fitting interconnecting means for interconnecting said cap to said anchoring means of said body, said output coupler being securely held between said alignment means of said inner surface of said body and said end of said cap, wherein said output coupler is in axial alignment with said bore of said body.

2. The housing for the output coupler of a laser in accordance with claim 1, wherein said elongated body is generally tubular in shape.

3. The housing for the output coupler of a laser in accordance with claim 1, wherein said outer surface of said elongated body includes a flange member on the end opposite said anchoring means.

4. The housing for the output coupler of a laser in accordance with claim 1, wherein said bore of said body is centrally located and extends longitudinally therethrough.

5. The housing for the output coupler of a laser in accordance with claim 1, wherein said alignment means includes an annular inwardly extending ledge.

6. The housing for the output coupler of a laser in accordance with claim 1, wherein said aperture of said end of said cap is centrally located thereon.

7. The housing for the output coupler of a laser in accordance with claim 1, wherein said cap is generally tubular in shape.

8. The housing for the output coupler of a laser in accordance with claim 7, wherein at least a portion of said cap includes a diameter larger than the diameter of said outer surface of said body.

9. The housing for the output coupler of a laser in accordance with claim 1, wherein at least a portion of said body comprises a male member and at least a portion of said cap comprises a female member for receiving said male member.

10. The housing for the output coupler of a laser in accordance with claim 1, wherein said cap is telescopically engaged with and connected to said anchoring means of said body.

11. The housing for the output coupler of a laser in accordance with claim 1, wherein said end of said cap includes a generally annular indentation adjacent to said aperture thereof.

12. The housing for the output coupler of a laser in accordance with claim 11, wherein said indentation of said cap is sloped generally downwardly and inwardly in the direction toward said aperture.

13. The housing for the output coupler of a laser in accordance with claim 11, wherein said indentation of said cap and said end portion thereof are positioned at an angle of inclination in the range from about 1° to about 89°.

14. The housing for the output coupler of a laser in accordance with claim 11, wherein said indentation of said cap and said end portion thereof are positioned at an angle of inclination in the range from about 5° to about 25°.

15. The housing for the output coupler of a laser in accordance with claim 1, wherein said cap and said body are comprised of at least one material selected from the group consisting of metals, ceramics, glass, thermoplastic materials and thermosetting materials and combinations thereof.

* * * * *